United States Patent [19]

Brown

[11] 3,939,107

[45] Feb. 17, 1976

[54] FIRE-RETARDANT PARTICLE BOARD AND BINDER THEREFOR FROM AMINOPLAST WITH AMMONIUM POLYPHOSPHATE-FORMALDEHYDE PRODUCT

[75] Inventor: Gordon E. Brown, Eugene, Oreg.

[73] Assignee: Monsanto Company, St. Louis, Mo.

[22] Filed: Sept. 6, 1974

[21] Appl. No.: 503,890

[52] U.S. Cl............ 260/17.3; 260/29.4 R; 260/849; 260/DIG. 24; 428/528; 428/921
[51] Int. Cl.$^2$. C08L 1/00; C08L 61/24; C08L 61/34
[58] Field of Search........ 430/351; 260/29.4 R, 17.3

[56] References Cited
UNITED STATES PATENTS

| | | | |
|---|---|---|---|
| 2,193,630 | 3/1940 | Howald | 260/29.4 R |
| 2,312,210 | 2/1943 | Dearing | 260/29.4 R |
| 2,348,244 | 5/1944 | Dearing | 260/29.4 R |
| 2,378,724 | 6/1945 | Oldham | 260/29.4 R |
| 2,402,032 | 6/1946 | Fischer | 260/29.4 R |
| 2,582,961 | 1/1952 | Burnell et al. | 260/29.4 R |
| 2,625,524 | 1/1953 | Kvalnes et al. | 260/29.4 R |
| 3,372,131 | 3/1968 | Rohlfs et al. | 260/69 N |
| 3,839,239 | 10/1974 | Godfried | 260/2.5 EP |

*Primary Examiner*—Murray Tillman
*Assistant Examiner*—A. H. Koeckert
*Attorney, Agent, or Firm*—Joseph S. Nelson; Edward P. Grattan; James C. Logomasini

[57] ABSTRACT

Novel stable-in-use aminoplast resin binder solutions comprising aqueous solutions of predominantly a urea-formaldehyde resin having a formaldehyde to urea ratio of less than 2.0, from about 40 to 56% by weight dissolved ammonium polyphosphate reacted with 5 to 12.5 percent by weight formaldehyde and not more than 30% by weight water. Preferred aminoplast resin binder solutions also contain a methylolated melamine-formaldehyde resin. A novel process for the production of the stable aminoplast resin binder solutions containing high percentages of ammonium polyphosphates and suitable for production of fire-retardant particle board is disclosed.

15 Claims, No Drawings

FIRE-RETARDANT PARTICLE BOARD AND BINDER THEREFOR FROM AMINOPLAST WITH AMMONIUM POLYPHOSPHATE-FORMALDEHYDE PRODUCT

BACKGROUND OF THE INVENTION

Urea-formaldehyde resins are widely used in the wood products industry as adhesives for plywoods and binder resins for hardboard, chipboard, particle board and the like. Recently, due to considerations of safety and fire prevention, there has developed a demand for fire-retardant or fire-resistant plywoods and particle board or chipboard. Therefore, the prior art has sought methods for the incorporation of fire-retardant salts, and specifically such salts as ammonium phosphates and polyphosphates, into plywoods and particle board.

The prior art methods of incorporation of ammonium phosphates into particle boards have required mixing in the dry phosphate salt or spraying a solution thereof onto the particle board wood furnish and drying such furnish before adding resin binder thereto. However, a sprayed solution of ammonium polyphosphate will remain undried and sticky for long periods even at high temperatures. It requires temperatures of over 500°F. to render it non-sticky and this is far higher than normal hot pressing temperatures for particle boards. Alternatively, it has been suggested to incorporate the powdered dry salt into a binder resin, but such dry powdered salts are very difficult to disperse and maintain evenly dispersed in such resin solutions. Furthermore, they interfere with the smooth operation of the furnish depositing equipment when dry mixed into such furnish.

Attempts to blend aqueous solutions of ammonium polyphosphates with aqueous syrups of urea-formaldehyde or melamine-urea-formaldehyde resins have been successful only in very low concentrations of the phosphates, since higher concentrations of phosphates cause the resins to cloud and precipitate. These low concentrations are generally not sufficient to confer an acceptable level of flame retardancy on the final particle board product. Consequently, it has been desired to incorporate aqueous solutions of phosphate salts into urea-formaldehyde and melamine-urea-formaldehyde resins at concentrations higher than 10% by weight in order to simplify the process of production of fire-retardant particle boards.

It has now been found that certain aminoplast resins will remain stable to aqueous solutions of modified ammonium polyphosphates for extended periods making possible a fire-retardant binder resin solution quite suitable for use in the general commercial process for the production of particle board. The availability of such binder resin solutions makes possible the production of fire-retardant particle board produced as rapidly with the same number of steps as are required for the present production of non-fire-retardant particle boards. These novel fire-retardant binder resin solutions can be used in the same manner and with the same facility as ordinary aminoplast binder resin solutions but contain much higher concentrations of ammonium phosphates than are compatible with such normal resin solutions. Thus, industry is enable to produce fire-retardant particle board by the same processes and at the same rate of production as the non-fire-retardant particle boards. A further advantage is the fact that the novel binder resin solutions do not require dilution with increased amounts of water which would, in turn, require a separate drying step for the wood furnish. As a consequence, these novel binder resin solutions and process for their production represent a decided improvement in both economics and safety.

SUMMARY OF THE INVENTION

The present invention is directed to the process for the production of a resin binder solution and the resin binder solution product comprising a clear aqueous solution of predominantly a urea-formaldehyde resin having a formaldehyde to urea ratio of less than 2.0, and preferably about 1.2 to 1.8, preferably a minor proportion of a methylolated melamine-formaldehyde resin, from about 40 to 56% by weight dissolved ammonium polyphosphate reacted with 5 to 12.5 parts formaldehyde and not more than 30% by weight water.

The process for production of the novel binder resin solution comprises mixing with a substantially neutral aqueous solution of a low molecular weight urea-formaldehyde resin of a mol ratio of from about 3.0 to 3.5 formaldehyde/urea, said solution having a viscosity of from 60 to 100 cps and a percent solids of at least 70 percent, sufficient urea to reduce the formaldehyde/urea ratio to from about 1.2 to 2.0 and sufficient of a stable concentrated aqueous solution of ammonium polyphosphate reacted with from 5 to 12.5 parts by weight of formaldehyde and adjusted to a pH of from 4.7 to 6.2 having a percent solids of at least about 55 percent to produce a concentration of dissolved ammonium polyphosphate of about 40 to 56 percent in the resulting stable binder resin solution. Preferably, from about 15 to 25 percent by weight of a methylolated melamine-formaldehyde resin in aqueous solution of at least about 50 percent solids, and preferably more than 60 percent solids, can be added to the neutral aqueous urea-formaldehyde solution prior to mixing therewith the urea and ammonium polyphosphate solution detailed above.

DETAILED EMBODIMENTS

The starting material to produce the desired resin binder solutions of the present invention is a low molecular weight urea-formaldehyde resin of from about 3.0 to 3.5 formaldehyde/urea ratio in substantially neutral aqueous solution. Such high F/U ratio, low or lightly bodied resin can be obtained by the method described in copending application Ser. No. 430,351 filed Jan. 2, 1974 by Gordon E. Brown. That method consists in initial reaction under alkaline conditions at a temperature of at least 75°C., cooling and adjusting to an acid pH of from about 1.7 to 2.1 and reacting at a temperature of from 30° to 55°C. to body the resin to the desired viscosity, neutralizing the solution and cooling to ambient temperature. The desired low molecular weight or lightly bodied resin will have a viscosity of from about 60 to 100 cps at 21°C. which can be obtained with only about 3 to 10 minutes of bodying reaction at the acid pH specified and 30° to 55°C. Thereafter the neutralized aqueous solution is conveniently subjected to distillation of a portion of the water present to concentrate the UF resin solution to a high solids content of from about 70 to 95 percent, preferably 80 to 90 percent solids. Such early concentration will avoid the necessity for later concentration of the finished binder resin or redrying of the particle board furnish produced to acceptable moisture limits for hot pressing.

A preferred base resin comprises such high F/U ratio, low molecular weight urea-formaldehyde resin above described further mixed with a methylolated melamine-formaldehyde resin in aqueous solution of a solids content of at least 50 percent, and preferably at least 60 percent, in an amount of from about 15 to 25 percent by weight of the starting UF resin. Such mixed resin solution is hereafter referred to as melamine-urea-formaldehyde resin solution or MUF resin base. It has been found that the presence of ammonium phosphates in UF binder resin solutions tends to lead to decomposition of the UF resin under high temperature hot pressing conditions, but that fortification thereof with the indicated amount of methylolated melamine-formaldehyde resin overcomes this tendency and renders the mixed resin base relatively stable in the presence of ammonium phosphates under high temperatures. Desirably the resin base will constitute from about 25 to about 40 percent by weight of the total binder solution composition.

A distillation process can be used to concentrate the solids content of the MUF base resin to at least 70 percent, and preferably to about 80 to 90 percent, if required. If desired, the concentration can be performed after addition of the melamine-formaldehyde resin solution, rather than of the starting urea-formaldehyde resin as discussed above.

There is added to the concentrated urea-formaldehyde base resin, or alternatively the above-described MUF resin base, sufficient urea to adjust the F/U ratio of the resulting mixture to less than 2.0. Preferably, sufficient urea is added to produce an F/U ratio of from 1.2 to 1.8. There is generally required from about 20 to 30 percent by weight urea on the basis of the MUF resin base. The urea can be added dry or as a concentrated aqueous solution as desired.

In order to produce a fire-retardant resin binder solution and a particle board produced therewith of the highest fire-retardant ratings, it is desirable to include in the resin binder solution the highest concentration of ammonium phosphate which is compatible with stability of the mixed resin solution produced. However, care must be taken that the ammonium phosphate content of the binder solution is not so great as to interfere with the spraying and mixing of the binder solution with the wood particle furnish for the manufacture of particle boards. The amounts of ammonium phosphate solutions specified herein have been found to produce high fire-retardant ratings in particle board products and to be easily and efficiently applied and mixed in typical commercial particle board production processes.

It has been found that the ammonium polyphosphate content can be supplied by a variety of compatible aqueous solutions thereof. The most preferred sources of ammonium phosphates are aqueous solutions of ammonium polyphosphates since such solutions can contain greater amounts of the phosphates prior to saturation. Such solutions are generally commercially available from the fertilizer industry and are complex gross mixtures of various condensed and polyphosphates as the ammonium salts produced by ammoniating a phospholeum of from 95 to 120 percent total phosphate content, which phospholeums are commercially available condensed phosphoric acid solutions. Typical ammonium polyphosphate solutions expressed by plant food content analysis are the 10-34-0 ammonium polyphosphate available as a 60 percent solution from fertilizer producers and 11-37-0 ammonium polyphosphate available as a 66 percent solution from the TVA and others. Such ammonium polyphosphate solutions enable one to produce binder solutions containing higher phosphate contents with little increase in the diluting water present.

However, such condensed ammonium phosphate and polyphosphates cannot practically be used in binder resins without other additives because, (1) they are incompatible with UF and MUF resin syrups, (2) the ammonium ion concentration reacts with the free formaldehyde in the only partially bodied resins and prevents normal resinification, and (3) the ammonium ion demonstrates no latency so that such polyphosphate salts severely retard the cure of the binder resin at board pressing temperatures. Hence, when ammonium polyphosphate solutions are employed it has been found that reaction thereof with from 5 to 12.5 percent by weight formaldehyde renders the ammonium polyphosphates compatible with the UF and MUF resins and fully usable therewith. Furthermore, it has been found that the strong buffering effect of ammonium polyphosphate is overcome by reaction of the ammonium ion with the formaldehyde which serves to lower the pH of the resulting polyphosphate solutions and of a resin solution containing same to promote a normal and acceptable curing rate. Consequently, it has been found essential to react a concentrated ammonium polyphosphate solution with from 5 to 12.5 percent by weight formaldehyde prior to mixing them with a UF or MUF resin base. To avoid too acid a pH it has been found convenient to adjust the pH with a base to from about 4.7 to 6.2 in the resulting reacted solutions. It has also been found convenient to concentrate the solutions by distillation under vacuum to restore the phosphate concentration in the formaldehyde reacted solutions, if this is desired.

It has been found that such solutions of ammonium polyphosphates reacted with formaldehyde are stable for commercially adequate periods and show no tendency to precipitate in storage for upwards of one week. The formaldehyde-reacted polyphosphate solutions are termed herein F.R. solutions.

Typical formaldehyde-reacted ammonium polyphosphate solutions based on 100 parts ammonium polyphosphate suitable for blending with the urea-formaldehyde or melamine-urea-formaldehyde resin bases are those of the following compositions:

| Ingredient | F.R. Solutions Solution Conc. | Parts | % Solids |
| --- | --- | --- | --- |
| 10-34-0 APP | 60% | 100 | 79–90 |
| or 11-37-0 APP | 66% | 100 | 81–92 |
| Formalin | 50% | 10–25 | 7–16.5 |
| Caustic | 50% | 2–6 | 1.4–4.0 |

Thus, on a 100 percent solids basis, such solutions can contain from 79 to 92% ammonium polyphosphate, from 7 to 16.5% formaldehyde and from 1.4 to 4.0% caustic.

The most preferred solutions are those containing the greater amounts of ammonium polyphosphates since they will produce the highest phosphate concentrations in the blended binder resin solutions. A quite useful and stable ammonium polyphosphate or F.R. solution having a pH of 5.3 has been found to be one of the following composition:

```
100 parts 11-37-0 APP —        66% solution
 15 parts Formalin —           50% solution
  4 parts Caustic —            50% solution
```

On a 100% solids basis the above 75.5% solids solution contains 87.4 ammonium polyphosphate, 9.9% formaldehyde and 2.7% caustic.

When mixed with the above-described melamine-urea-formaldehyde resin base and sufficient urea to produce a formaldehyde/urea ratio of from about 1.2 to 2.0, the fire-retardant binder resin solutions produced will have the following typical compositions, based on 100 parts solution:

| | Binder Resin Solution Parts | % Solids Wt. |
|---|---|---|
| MUF Resin Base | 26–40 | 28–42 |
| Urea | 6–10 | 7.5–12 |
| F.R. Solution | 50–68 | 46–64.5 |

The above typical binder resin solutions contain between about 40 and 56 percent by weight ammonium polyphosphate and, when applied to wood particle furnish at a typical 30 percent based on the weight of the bone dry wood particles will supply from 12 to 16.8 percent ammonium polyphosphate in the finished particle boards. When applied at 25 to 40 percent rates they will supply from 10 to 22 percent ammonium polyphosphate in the boards. These binder resin solutions have solids contents ranging from about 77 to 83 percent.

When referred to herein as condensed ammonium phosphates or ammonium polyphosphates any of the condensed ammonium phosphates can be employed, including the ammonium polyphosphates from orthophosphoric acid, the ammonium metaphosphates and the ammonium ultraphosphates. Any of such aqueous solutions can be used as a source of ammonium phosphate in the new fire-retardant binder resins.

The fire-retardant particle boards produced with the new binder resins are made by the usual industrial processes for such boards. These processes involve spraying the desired concentration of resin solution onto a dried wood particle furnish, thorough blending thereof, deposit of the furnish and resin onto supporting cauls and pressing the wood particle furnish to stops at from about 300 to 400 psi at temperatures of from about 275° to 350°F. for periods of from about 3 to 8 minutes to produce the finished particle boards.

The strength properties of the particle boards described in the examples below are described in terms of the modulus of rupture in pounds per square inch, internal bond values in pounds per square inch, and densities of the test particle boards produced. The modulus of rupture property is determined by tests carried out in accordance with ASTM Test D-1037-60T. The internal bond values, also known as tensile strength perpendicular to the surface, are determined in accordance with the same ASTM Test D-1037-60T.

The sample particle boards described in the examples below were tested for fire-retardancy rating by the well-known Schlyter Burning Test described in "Fire-Test Methods", Forest Products Laboratory Report No. 1443, U.S.D.A. Forest Service (1959), modified by the use of methane as the fuel rather than the standard natural gas. Ratings from the test are given in terms of flame spread in 5 minutes as a percentage of the flame spread in the same period on standard untreated red oak lumber one inch thick. Type I or Class I fire-retardancy is represented by flame spread ratings of 25 or less, i.e., 25 percent of standard, while Type II or Class II fire-retardancy is represented by ratings of from 25 to 75, i.e. percent, based on red oak lumber as standard.

The examples below will serve to further illustrate the fire-retardant properties of particle boards prepared with the novel binder resin solutions of the present invention.

EXAMPLE I

This example illustrates the use of fire-retardant binder resin solutions of the present invention to prepare high quality particle boards of good strength and density. A urea-formaldehyde resin was prepared by reacting 100 parts of a 50% aqueous formalin solution with 31.8 parts of urea at a pH of about 9.0 for 5 minutes at 80°C., cooling the mixture to 60°C., distilling off 10% of the water present to a temperature of about 40°C. Thereafter the resin solution was adjusted to a pH of 1.8 with sulfuric acid and the resin bodied for 5 minutes and neutralized. The resin solution was distilled to a solids content of 89 percent, cooled, and mixed with 20% by weight on the basis of the UF resin of a 65 percent aqueous solution of a methylolated melamine-formaldehyde resin (Resimene 841). This 5:1 mixture formed the melamine-urea-formaldehyde base resin of approximately 85 percent solids.

The F.R. solutions were prepared by reacting 100 parts of a 66 percent aqueous solution of 11-37-0 ammonium polyphosphate having a pH of 6.1 with 10 to 25 parts of a 50 percent aqueous formalin solution. As the formalin reacted with the ammonium ion the pH dropped to below 4.5. There was then added 2 to 4 parts of a 50 percent aqueous caustic solution to adjust the pH to approximately 4.7 to 6.2. There was then removed by vacuum distillation sufficient parts of water to readjust the phosphate concentration to approximately the original 66 percent. The total solids content of the resulting concentrated solutions stable for periods of two weeks were approximately 72 to 78 percent. The compositions of the F.R. solutions thus prepared are set out in Table 1 together with the viscosity and pH of each solution.

Table 1

| Solution | Parts APP | Parts Formalin | Parts Caustic | Viscosity, cps | pH |
|---|---|---|---|---|---|
| A. | 100 | 25 | 4 | 375 | 4.7 |
| B. | 100 | 20 | 4 | 254 | 5.0 |
| C. | 100 | 15 | 4 | 241 | 5.4 |
| D. | 100 | 10 | 4 | 228 | 6.2 |
| E. | 100 | 20 | 4 | 254 | 5.0 |
| F. | 100 | 15 | 4 | 241 | 5.4 |

There were then mixed with 30 parts of the above MUF base resin 7.5 parts of urea and 62.5 parts of the F.R. solutions produced as described above from 11-37-0 ammonium polyphosphate to produce the aqueous binder resin syrups of about 36 cps viscosity. These binder resin solutions of about 20 percent water were excellent particle board binders stable for periods of at least 6 hours at 75°F. until thickened beyond sprayability.

Particle boards were prepared in the usual manner from dried wood particle furnish sprayed with 30 percent of the above solutions based on the weight of the dry wood furnish, sufficient solution to supply approximately 13.2% of ammonium polyphosphate in the finished particle boards. The boards were ¾ inch thick with a density of about 47 pounds per cubic foot produced by pressing for 7 minutes at 325°F. to stops under a pressure of about 350 psi. These sample particle boards were subjected to testing for modulus of rupture, internal bonding and density by the tests described above and the results are set out in Table 2 below.

Table 2

| Binder Resin | F.R. Sol'n. | MOR | IB | Density |
| --- | --- | --- | --- | --- |
| 1 | A | 1650 | 116 | .718 |
| 2 | B | 1820 | 139 | .721 |
| 2 (Repeat) | B | 2290 | 153 | .713 |
| 3 | C | 1670 | 102 | .709 |
| 4 | D | 1640 | 96 | .714 |
| 5 | E | 1970 | 128 | .723 |
| 6 | F | 2040 | 118 | .728 |
| 6 (Repeat) | F | 2020 | 133 | .724 |

Thus, the above-described binder resin solutions are shown to produce good quality particle boards with fully acceptable modulus of rupture and internal bonding indicating high strength boards.

EXAMPLE II

This example illustrates the production of highly fire-resistant strong particle boards from the binder resin solutions of the present invention. All the test particle boards were produced at 15 × 42 inch boards, of ¾ inch thickness by a pressing cycle of 7.5 minutes at a pressing temperature of 325°F. and pressure of 350 psi. All the test boards demonstrated Type I fire-retardancy by the above-described Schlyter test.

The binder resin solutions were prepared as described in Example I from 30 parts of the same MUF resin base as Example I, 7.5 parts urea and 62.5 parts of F.R. solution C described in Table 1 above. The binder solutions were sprayed at the rate of 32 percent by weight (boards 7 and 8) and 35.2 percent (board 9) onto wood particle furnish that was then air stratified wherein the fine particles were concentrated at the surface and the coarse particles at the center. After pressing, the cooled boards were tested for modulus of rupture and internal bonding as set out below and were further subjected to the Schlyter flame spread test described. The flame spread ratings, all well within the criteria for Type I fire-retardancy, also set out in Table 3 below, are expressed as percent of those found with a red oak board standard, on repeat burnings.

Table 3

| Board | Binder % | MOR | IB | Flame Spreads |
| --- | --- | --- | --- | --- |
| 7 | 32 | 2024 | 76 | 14, 16 |
| 7 | 32 | 2102 | 51 | 14, 16 |
| 8 | 32 | 2016 | 52 | 14, 14 |
| 8 | 32 | 2230 | 59 | 14, 14 |
| 9 | 35.2 | 2819 | 54 | 14, 14 |

EXAMPLE III

Additional test particle boards were prepared which contained in the pressed furnish five percent of a dry, solid flame retardant, boric acid or monoammonium phosphate, in addition to the same fire-retardant binder resin solutions of the present invention, used at a 30 and 32 percent spray level on the same air stratified particle furnish. No differences in the flame spread ratings by the Schlyter test were found. These ratings as well as modulus of rupture and internal bonding measurement are set out in Table 4 below.

Table 4

| Board | Dry F.R. | Binder % | MOR | IB | Flame Spread |
| --- | --- | --- | --- | --- | --- |
| 10 | Boric A. | 32 | 1870 | 60 | 14, 14 |
| 10 | Boric A. | 32 | 1580 | 45 | 14, 14 |
| 11 | MAP | 30 | 3054 | 47 | 14, 14 |

What is claimed is:

1. A fire retardant aminoplast binder resin solution containing not more than 30 percent by weight water consisting of
    A. a substantially neutral aqueous solution of a low molecular weight urea-formaldehyde resin of a mol ratio of from about 3.0 to 3.5 formaldehyde to urea, a viscosity of from about 60 to 100 cps and a percent solids of at least 70 percent,
    B. sufficient urea to reduce the formaldehyde to urea ratio to from about 1.2 to 2.0, and
    C. a stable concentrated aqueous solution having a percent solids of at least 55 percent of ammonium polyphosphate reacted with from 5 to 12.5 percent by weight formaldehyde adjusted to a pH of from 4.7 to 6.2 to produce a concentration of dissolved ammonium polyphosphate of from about 40 to 56 percent by weight in said binder resin solution.

2. A fire-retardant aminoplast binder resin solution containing not more than 30 percent by weight water consisting of
    A. a substantially neutral aqueous solution of a low molecular weight urea-formaldehyde resin of a mol ratio of from about 3.0 to 3.5 formaldehyde to urea, a viscosity of from about 60 to 100 cps and a percent solids of at least 70 percent,
    B. sufficient urea to reduce the formaldehyde to urea ratio to from about 1.2 to 2.0,
    C. a stable concentrated aqueous solution having a percent solids of at least 55 percent of ammonium polyphosphate reacted with from 5 to 12.5 percent by weight formaldehyde adjusted to a pH of from 4.7 to 6.2 to produce a concentration of dissolved ammonium polyphosphate of from about 40 to 56 percent by weight in said binder resin solution and
    D. from 15 to 25 percent by weight based on the urea-formaldehyde resin of a methylolated melamine-formaldehyde resin.

3. The binder resin solution of claim 2 wherein the dissolved ammonium polyphosphate is selected from 10-34-0 and 11-37-0 ammonium polyphosphates.

4. The binder resin solution of claim 2 wherein the ammonium polyphosphate formaldehyde reaction product contains, on a 100 percent solids basis, 79-92 percent ammonium polyphosphate, 7 to 16.5 percent formaldehyde and 1.4 to 4 percent caustic.

5. The binder resin solution of claim 2 wherein the melamine-formaldehyde and urea-formaldehyde resin solutions comprise from about 25 to about 40 weight percent of said solution.

6. A process for production of a fire-retardant aminoplast binder resin solution containing not more than 30 percent by weight water which comprises A. mixing with a substantially neutral aqueous solution of a low molecular weight urea-formaldehyde resin of a mol ratio of from about 3.0 to 3.5 formaldehyde to urea, a viscosity of from about 60 to 100 cps and a percent solids of at least 70 percent, B. sufficient urea to reduce the formaldehyde to urea ratio to from about 1.2 to 2.0, and C. a stable concentrated aqueous solution having a percent solids of at least 55 percent of ammonium polyphosphate reacted with from 5 to 12.5 percent by weight formaldehyde adjusted to a pH of from 4.7 to 6.2 to produce a concentration of dissolved ammonium polyphosphate of from about 40 to 56 percent by weight in said binder resin solution.

7. The process of claim 6 wherein there is mixed with the urea-formaldehyde resin solution of (A) from about 15 to 25 percent by weight thereof of an aqueous solution of at least 50 percent solids of a methylolated melamine-formaldehyde resin so as to produce a melamine-urea-formaldehyde resin solution of at least 70 percent solids.

8. The process of claim 7 wherein the melamine-urea-formaldehyde resin solution is subjected to distillation to concentrate same to a solids content of at least 70 percent.

9. The process of claim 7 wherein the solution of ammonium polyphosphate is an aqueous solution of a reaction mixture on a solids basis of from 79 to 92 percent ammonium polyphosphate, from 7 to 16.5 percent formaldehyde and from 1.4 to 4 percent caustic.

10. The process of claim 7 wherein the formaldehyde-reacted ammonium polyphosphate solution is subjected to distillation to concentrate same to a solids content of at least 70 percent.

11. The process of claim 7 wherein the urea-formaldehyde resin solution has a solids content of at least 85 percent, wherein the methylolated melamine-formaldehyde resin solution has a solids content of at least 60 percent and is present in an amount of about 20 percent of the weight of the urea-formaldehyde resin, wherein the solution of ammonium polyphosphate comprises a 60 to 66 percent solution of ammonium polyphosphate reacted with 10 to 25 parts formalin solution and 2 to 6 parts caustic solution, and the mixed binder resin solution has a solids content of at least 75 percent.

12. The process of claim 7 wherein the urea-formaldehyde resin solution has a solids content of at least 85 percent, wherein the methylolated melamine-formaldehyde resin solution has a solids content of at least 60 percent and is present in an amount of about 20 percent of the weight of the urea-formaldehyde resin, wherein the solution of ammonium polyphosphate comprises about 100 parts of a 66 percent 11-37-0 ammonium polyphosphate solution, about 15 parts of a 50 percent formaldehyde solution and about 4 parts of a 50 percent caustic solution concentrated to a solids content of about 75 percent, and the mixed binder resin solution has a solids content of at least 75 percent.

13. A fire-retardant particle board comprising wood particles bonded with a composition of claim 2.

14. The fire-retardant particle board of claim 13 wherein the aminoplast resin binder is a melamine-urea-formaldehyde resin and the ammonium polyphosphate is selected from 10-34-0 and 11-37-0 ammonium polyphosphates.

15. The fire-retardant particle board of claim 14 wherein the ammonium polyphosphate is present in an amount of from 12 to 16.8 percent by weight.

* * * * *